United States Patent [19]

Bidon

[11] 4,186,811
[45] Feb. 5, 1980

[54] TRACTOR VEHICLE IN PARTICULAR FOR AGRICULTURAL USE

[76] Inventor: Jacques Bidon, 51230 Velye, Vertus, France

[21] Appl. No.: 886,817

[22] Filed: Mar. 15, 1978

Related U.S. Application Data

[63] Continuation of Ser. No. 765,779, Feb. 4, 1977, abandoned.

[30] Foreign Application Priority Data

Feb. 10, 1976 [FR] France .................................. 76 03589

[51] Int. Cl.² ............................................. B62D 11/04
[52] U.S. Cl. ..................................... 180/6.48; 172/9; 180/77 S
[58] Field of Search ................. 180/6, 48, 77 S, 135; 172/7, 9

[56] References Cited

U.S. PATENT DOCUMENTS

| | | | |
|---|---|---|---|
| 3,182,605 | 5/1965 | Brasher | 180/77 S |
| 3,256,950 | 6/1966 | DeBiasi | 180/6.48 |
| 3,461,669 | 8/1969 | Kanengieter | 180/6.48 |
| 3,860,074 | 1/1975 | Maistrelli | 172/9 X |
| 3,866,700 | 2/1975 | Bauer | 180/6.48 |
| 3,907,053 | 9/1975 | Savage | 180/6.48 |
| 3,998,289 | 12/1976 | Maurer | 180/135 X |

FOREIGN PATENT DOCUMENTS

| | | | |
|---|---|---|---|
| 864464 | 1/1953 | Fed. Rep. of Germany | 180/6.48 |
| F15194II6-3c | 11/1958 | Fed. Rep. of Germany | 180/6.48 |
| 1202651 | 11/1965 | Fed. Rep. of Germany | 180/77 S |
| 2046552 | 4/1971 | Fed. Rep. of Germany | 180/77 S |
| 2528048 | 1/1976 | Fed. Rep. of Germany | 180/6.48 |
| 1545123 | 9/1968 | France | 180/77 S |
| 158751 | 2/1970 | France | 180/6.48 |
| 2257484 | 8/1975 | France | 180/6.48 |

*Primary Examiner*—John A. Pekar
*Attorney, Agent, or Firm*—Stevens, Davis, Miller & Mosher

[57] ABSTRACT

The tractor vehicle comprises a chassis supported by at least two sets of driving and steering wheels. A cab is fixed to the chassis and encloses the devices for driving the vehicle and the devices controlling tools coupled to the power take-off of the vehicle. The two sets of driving and steering wheels are driven in pairs located on the same side of the chassis by an independent drive. The two drives are interconnected by variator-inverter devices which act selectively on either of the two drives or on both thereof in a symmetrical or unsymmetrical manner. The vehicle may be employed not only in the agricultural field but in any other application such as public works.

7 Claims, 7 Drawing Figures

TRACTOR VEHICLE IN PARTICULAR FOR AGRICULTURAL USE

This is a continuation of application Ser. No. 765,779 filed Feb. 4, 1977, now abandoned.

The invention relates to a tractor vehicle in particular for agricultural use, although this machine may be employed for other purposes, such as public works.

These vehicles, which are well known in the rural world, usually comprise a chassis supported by two sets of driving and steering wheels, the chassis being surmounted by a driving cab in which the operator is placed. The chassis most often has, at the rear, a power take-off which is capable of being coupled to earth working tools, a "three point" coupling, and a hydraulic raising device. These various devices are sometimes located in the front of the machine when the latter does not have a towing function but a pushing function. This type of machine, which is well known to cultivators, has many drawbacks as concerns its design, its handling and its driving on the ground.

As concerns the developed power:

The conventional tractor has only two driving wheels which are really adapted and capable of developing the power that the engine is capable of furnishing.

Sometimes a front driving axle is added to improve the efficiency of the tractor. Generally, it might be said that tractors of more than 100 HP utilize very inefficiently the power of their engine. For high powers, tractors have a poor adherence to the ground. To overcome this it is necessary to render them considerably heavier (inflation of the wheels with water—provision of many weighting masses, etc.). The dimensions of the pneumatic tires are also increased (45 to 50 cm). The pneumatic equipment of these tractors is no longer sufficiently polyvalent and the more they are widened the less they can be employed, principally for crops arranged in rows (beetroots, potatoes, treatment of cereals, etc.). They must be replaced by narrow equipments, most of the time coupled at the spacing of the crops. The use of wide pneumatic tires presses down an excessively large area of earth which is sometimes difficult to recover. The wear of these tires is greater and costs more than that of smaller tires.

The front driving axles are often imperfectly adapted. For certain work the equilibrium of the weight between the front driving axle and the rear driving axle is unsatisfactory in many cases. The front driving axles reduce the turning circles. The tractor becomes much less easy to handle and does not allow any skid-turning at the field ends.

The differential locking is only valid for straightahead travel. It is not always possible with front driving axles. It is difficult to achieve a transmission which is proportional to the travel with a driving axle which is located under a trailer vehicle (too many universal joints, which are difficult to use when turning, etc.).

As concerns the items of equipment:

There is no front power take-off which is really adapted for the purpose, whence the necessity to provide lay shafts leading from the rear power take-off with the use of universal joints, speed reducing shafts, etc. Which arrangement is hardly elegant from the mechanical point of view. There is no front lifting. This is mainly due to the fact that the tractors no longer have a chassis on which fixing means for multiple uses may be provided. There is no bearing platform on which there may be adapted different containers (fertilizers, seeds, treating products) or other adaptations (cranes, buckets).

As concerns the driving of the tractor:

The gear-boxes are not all equipped with synchronized speeds. In any case it is very difficult to change speed when towing a heavy load on wet ground.

There is no possibility of reversing the travel. Tractors are equipped in such manner that they can only be employed in one direction of travel, and it is up to the user to make the best of the situation. To do this, he must most of the time drive his tractor while looking at the tool located behind him.

There is no continuous speed variator from 0 to 27 km per hour. Most of the time no speed really corresponds to the envisaged work or to the equipment towed, coupled and used.

The speed, raising and steering controls are often very badly positioned and do not take into account that these machines are employed essentially for working the earth (the levers located between often soiled feet reduce the freedom of movement of the driver, etc.).

Poor visibility in front owing to the front driving axle and the engine, and at the rear owing to the fact that the driver must turn round for this purpose. Visibility is bad in many other applications since the cab is inserted between the two rear wheels of the machine.

Comfort is very often poor, since the tractor follows rather badly the contour of the ground. Without a forward driving axle the comfort is still worse.

An object of the invention is to overcome these various drawbacks, the list of which is not exhaustive, and concerns a mobile machine of the tractor type equipped with wheels provided with pneumatic tires of small width which may consequently be employed in any type of cultivation, this feature resulting from the fact that the chassis is supported by six driving and steering wheels on which there are distributed the load and the forces required for moving the machine, these wheels being driven in such manner that it is possible, in the extreme case, to lock the three wheels located on one side of the chassis and drive the other three to achieve a complete skid-turning of the vehicle.

Lastly, the vehicle is provided both in front and at the rear with coupling and raising means and force take-offs allowing its utilization in either direction, since it is capable of moving in two opposite directions owing to the reversibility of the wheel driving means. The driving, the control and the actuation of the tools connected to the vehicle are, moreover, rendered possible by the fact that the cab or compartment is movable in translation and that the driving station is pivotably mounted so that the operator is always facing the stretch of ground to be treated, irrespective of the direction of the vehicle.

The invention therefore concerns a tractor vehicle, in particular for agricultural use, of the type comprising a chassis supported by at least two sets of driving wheels, on which chassis there is fixed a cab enclosing the vehicle driving means and the means for controlling the tools coupled to the power take-off of the vehicle, wherein said driving wheels are controlled in pairs, each of which pairs is located on the same side of the chassis and driven by an independent drive, the two drives being interconnected by variator-inverter means whereby it is possible to act selectively on either of the two drives or on both at the same time in a symmetrical or unsymmetrical manner.

According to a preferred embodiment, each of the two independent drives comprises a variable delivery hydraulic pump operating in a closed circuit, the two pumps being connected to two outputs of a coupling unit which has a third output intended for a power take-off, and an input for coupling to the crankshaft of the engine.

In this case, it may be advantageous to arrange that the third output of the coupling unit be connected to a third hydraulic pump which drives at least one hydraulic motor actuating the power take-off. Such an arrangement has the great advantage of simplifying the whole of the equipment of the vehicle since it utilizes, for achieving a hydraulic transmission of power, the existence of a hydraulic drive for driving the vehicle. Advantageously, a speed reducer may be interposed between the hydraulic motor and the power take-off. Also, preferably, this third hydraulic pump may drive at least one hydraulic motor actuating a tool provided for the vehicle.

According to another feature of the invention, the two independent drives are reversible so that the vehicle is capable of travelling in opposite directions, and the driving cab is movable in translation in opposite directions on the chassis, the driving station within this cab being mounted to be pivotable through at least 180° about a vertical axis so that, irrespective of the direction of travel of the vehicle, the operator faces the stretch of ground to be treated.

In this case and when the vehicle has in the vicinity of each of the two front and rear sets of wheels a hydraulic raising device comprising two upper arms pivoted to the chassis and two lower arms, the two upper arms are preferably integral with each other and the two lower arms are fixed to a flexion bar and two stays interconnect these two pairs of arms, the upper arms being provided with a position sensor and the flexion bar being provided with a deformation sensor. These two sensors are connected to an electric control unit which reacts, on one hand, in accordance with signals produced by these sensors and, on the other hand, in accordance with values fed into or set on the position control and the force control located in the cab.

Further, in this case, it may be advantageous to arrange that the upper arms, which are connected to the lower arms by the stays, be provided with a position sensor whereas a pressure sensor is inserted in the hydraulic fluid supply circuit for the motors driving the driving wheels, these two sensors being connected to an electric control unit to which the position control and force control means in the cab are also connected. This arrangement also very advantageously simplifies all of the equipment since it utilizes, again, for obtaining a force measuring signal, the existence of the same hydraulic drive. Advantageously, the control unit may include two amplifiers respectively for the position and force, whereas the control means comprise regulating potentiometers. Also, preferably, there may be provided a hydraulic distributor valve, which is actuated by the control unit which actuates the jacks actuating the raising device.

According to another preferred embodiment, the chassis comprises, in the longitudinal direction, two sections which are articulated to each other to pivot about a vertical axis which is offset toward the front of the vehicle with respect to the middle of the latter. A very important advantage of this arrangement is that the performance of the tools disposed at the rear of the vehicle is unaffected upon a lateral inclination of the front section of the chassis, for example under the effect of the nature of the ground. Advantageously, the front section of the chassis may be shifted in rotation by at least one hydraulic jack mounted on the rear section.

Further features and advantages will be apparent from the ensuing description and the accompanying drawings which refer to embodiments to which the invention is not intended to be limited.

Figure 1:
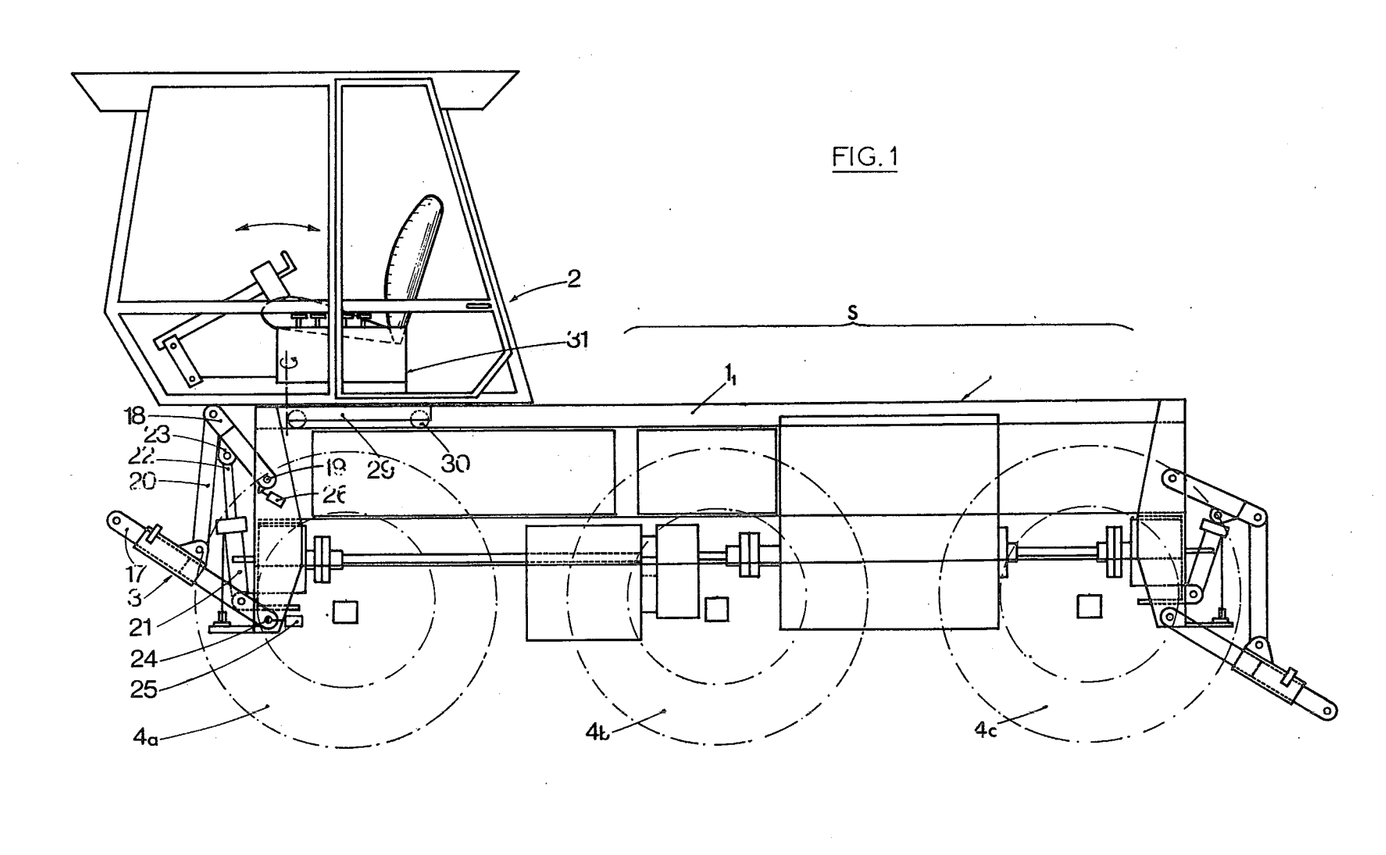
FIG. 1 is a side elevational view of the tractor vehicle.

The invention concerns a vehicle, such as an agricultural machine, comprising in the known manner, a chassis 1 supported by at least two sets of wheels, the chassis being provided with a driving cab 2 and at least one raising device 3 to which the ground-working tools are coupled. This tool may concern a harrow, a plough or any other like tool.

Figure 2:
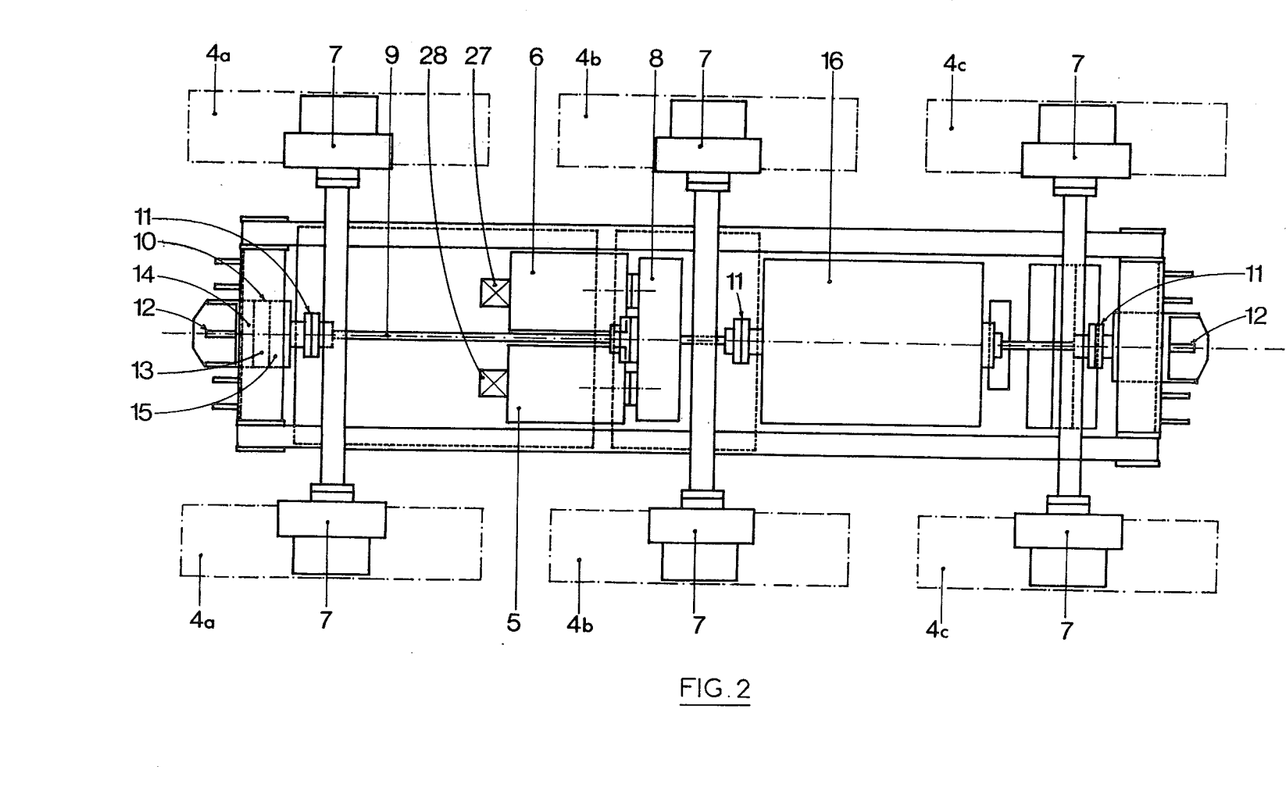
FIG. 2 is a top plan view of the vehicle shown in FIG. 1, the cab and the front and rear raising devices having been removed.

According to the invention, the vehicle comprises three sets of wheels 4a, 4b, 4c so that the load of the vehicle is distributed among six wheels, whereby it is possible to employ narrow rims for receiving pneumatic tires whose tread is such that the vehicle can pass freely between rows of plants which have even been spaced relatively close together. These narrow pneumatic tires are, moreover, much cheaper than those employed on conventional tractors. Furthermore, they require no interchanging when passing from one crop to another, so that the operator has no need to have a stock of tires of different widths and tread patterns.

The fact of employing six wheels not only enables the weight of the vehicle to be evenly distributed, it enables the energy which must be developed for driving the vehicle to be distributed in a symmetrical manner.

For this purpose, as can be seen in FIG. 2, the wheels 4a, 4b, 4c located on one side of the chassis are supplied with power by a drive independent of the drive driving the other wheels 4a, 4b, 4c on the other side of the chassis.

The power is uniformly distributed among the six wheels of equal size and is transmitted to these wheels by two pumps 5 and 6 which have a variable delivery or flow and are reversible. These pumps are of the barrel type and include in the conventional manner a booster pump and a protecting and exchanging unit. They are employed as a hydraulic inverter-variator and operate in a closed circuit with their respective wheels.

Thus each pump drives a set of three wheels located on each longitudinal side of the chassis, and each wheel is provided with a hydraulic motor 7 which is operative at either of 2 different cubic capacities. The pumps 5 and 6 are connected to a coupling box 8 through the centre of which box a power take-off shaft 9 extends, this shaft projecting at one end at the rear output of the engine, the other end being connected to the front power take-off unit 10 through an elastically yieldable lug-type coupling 11. The power take-off proper 12 is rendered operative by a clutch 13 contained in the power take-off box, and this clutch cooperates with a speed reducer 14 and an electro-hydraulic distributor valve 15. This mechanical construction is of course also provided at the other end of the vehicle.

The power is furnished to the two pumps 5 and 6 by a Diesel engine 16 which also supplies the energy for the two power take-offs 12, which latter may be rendered operative alternately or simultaneously.

The pumps are controlled electrically from the driving station and are fully independent of each other. By varying the delivery or flow of one pump with respect to the other, the vehicle can be skid-turned. This utilization enables the turning circle of the machine to be reduced when the nature of the ground allows this. In the extreme case, it is possible to completely neutralize one pump so that the three wheels located on one side of the vehicle are locked, and then proportionally supply fluid to the other pump so as to achieve a complete skid-turn, on the spot, of the machine on the locked set of wheels.

The vehicle is made to travel by inclining the swashplates of the two pumps 5 and 6 at the same angle so as to obtain identical deliveries from the pumps. The travelling speed of the vehicle is therefore proportional to the delivery of the pumps, and the variation of the delivery of one pump with respect to the other enables the machine to be turned to the right or the left. On the other hand, an identical variation of the deliveries of the two pumps enables the machine to be moved forwardly or rearwardly, or stopped. This arrangement provides a differential locking with no mechanical connection at the different travelling speeds of each set of wheels. Furthermore, when stationary, a hydrostatic braking of each wheel is achieved.

The vehicle drive controls are foot-operated from the driving cab. Under the right foot, there is a forward drive control of the vehicle whereas under the left foot there is a reverse drive control. These pedals actuate the control device of the delivery of the two pumps 5 and 6, and these controls are identical for the two pumps. The vehicle is steered by means of a steering-wheel which actuates the control of the deliveries of the two pumps; in this case, the two pumps are controlled differently.

Thus, when the vehicle is stationary, if the steering wheel is turned to the right through an angle α, the control device will maintain the delivery of the right pump null and produce a delivery of +d1 of the left pump. This will skid-turn the machine on itself (the set of right wheels being locked). If in addition it is desired that the machine travel forward, the right pedal will be depressed and the control device will then produce a delivery of +d2 of the two pumps.

This therefore gives, for the right pump:

$$D_r = 0 + d2$$

and for the left pump:

$$D_l = d1 + d2,$$

the machine will therefore travel forward in turning to the right since the value $D_l > D_r$.

The steering wheels may be actuated in the following manner: thus it is possible to:
 actuate the front driving wheels,
 actuate the rear driving wheels,
 actuate the front and rear driving wheels simultaneously.

This choice is made by means of separate control circuits for the front steering and rear steering.

The steering wheel actuates the control device of the delivery of the hydraulic pumps, but also the two orbitrols (step-by-step rotary distributor valves) for steering, one of which is mounted on the front set of wheels and the other on the rear axle. These orbitrols are actuated by electric motor-speed reducer units controlled by steering control circuits fixed to the steering wheel. If the steering wheel is turned in a given direction, there will be achieved both a control of the deliveries of the pumps 5 and 6 and a control of the electric motor-speed reducer units (not shown) actuating the orbitrols so as to achieve a change in direction.

As the vehicle is capable of travelling in two opposite directions, it is obviously desirable that it be capable of operating indifferently for towing or pushing, irrespective of its direction of travel. For this purpose, the vehicle is provided with a raising device 3 in the front and at the rear, these two devices being identical.

The raising device comprises two lower arms 17 which are connected to two upper arms or links 18, pivoted at 19 to the chassis 1 of the vehicle, through the agency of two stays 20, so that this assembly forms, with the cross-members of the chassis, a deformable parallelogram structure which is subjected to the action of two jacks 21 whose pistons 22 are connected by lugs 23 to the upper raising arms or links 18.

The two lower raising arms 17 are connected, in the region of their pivotal mounting 24, to a flexion bar which is combined with a force sensor 25 whereas the upper arms 18 are combined with a position sensor 26 controlling the height of the raising device.

These two raising devices have an independent control and the required hydraulic power is provided by a pump 27 driven by the Diesel engine 16.

This pump supplies fluid either to the two outer jacks 21 of the front raising device or to those of the rear raising device by way of hydraulic electro-distributing valves.

The control of the position determined by the sensor 26 associated with the raising arms is ensured electrically from the driving station through an electric positioning control unit. This control unit is actuated, on one hand, by the position sensor 26 mounted between the raising arms or links, and, on the other hand, by signals coming from the value that the operator feeds into or sets on the position control sector in the cab. In this way, the operator feeds the required value into the position control sector and the electro-distributor valve (not shown) supplies fluid to the raising jacks 21. When the latter reach the chosen position, the value of the signal produced by the position sensor 26 becomes such that the control unit produces the closure of the electro-distributor valve.

The force control device is also actuated electrically from the driving station through an electric control unit. This control unit is actuated, on one hand, by the signal of the force sensor 25 located on the flexion bar 24 interconnecting the two lower arms 17 and, on the other hand, by the signals coming from the value that the operator feeds into or sets on the force control sector in the cab.

Operation of the force control device.

A value E is fed into the force control sector in the cab. There corresponds to this value E a signal e which is fed to the control unit.

If the buckling in the flexion bar becomes great, so that the force sensor 25 connected thereto indicates a value e1 > e, this force control unit then produces the opening of the electro-distributor valve and thus raises the lower arms 17 so that the towing force is relieved.

When the value of e1 < e, this unit then produces the closure of the electro-distributor valve.

As the chosen position has been exceeded, the position control device takes over the regulation of the raising and returns the arms of the initial positions.

As the vehicle is capable of travelling in two opposite directions (reversibility of the pumps 5 and 6), a feature of the vehicle is to have a cab 2 which is movable in translation along upper longitudinal members $1_l$ of the chassis 1. The base of this cab is mounted on a carriage 29 provided with rollers 30 which roll along section members $1_l$ constituting the upper longitudinal members of the chassis.

This cab, movable in translation in opposite directions, may be held stationary in any position by locking means, such as pins, studs, spring-biased locks, screws or other means.

Preferably, this cab is held stationary in the region of the two end faces of the vehicle so as to leave free a surface S which constitutes a platform for receiving various appliances such as sprayers, distributors, tanks, buckets, etc.

Further, in order to allow the operator to face always in the direction of the stretch of ground to be treated, the driving station 31 in this cab is mounted to be rotatable on a pivotal hub so that the whole of the station, including the control means, can pivot through at least 180°.

The connections between the various driving means of the machine (Diesel engine, power take-off, pump coupling box) are achieved by flexible couplings allowing a disassembly of a single element of the transmission system in any region.

The machine according to the invention is so designed as to be utilizable on any ground, including the road, since the front set of wheels can be isolated from the hydraulic circuit, and its utilization is greatly facilitated by the two independent drives for the sets of wheels located on each side of the chassis, since it is possible, by varying the deliveries of the pumps, to cause the vehicle to travel in one direction or the other or to obtain the locking of one series of wheels to obtain its skid-turning on the spot.

As concerns the steering, the wheels of the front and rear sets of wheels 4a, 4c are driving and steering wheels but the wheels 4b of the intermediate set of wheels remain parallel to the axis of the machine in plan.

The machine according to the invention has the following advantages:

the machine can travel in both directions at any speed between 0 and 27 km per hour owing to the hydrostatic transmission;

the items of equipment are identical in the front and at the rear so that it is possible to couple the tools both to the front and to the rear of the machine;

the steering is effected on two axles, namely the front axle and rear axle, the centre axle remaining fixed, with the result that there is an improved turning circle. The latter can be still further improved by skid-turning the machine by means of the hydraulic pumps;

there is a differential locking on all the wheels in all conditions of use in a straight-ahead travel and when turning;

the cab, located completely above the wheels, improves the front visibility. The cab may be advanced or shifted back, depending on the work to be carried out, and the driver can choose the most suitable position;

the driving station inside the cab can turn through 0°–180° and assume any intermediate position;

the machine is much more easy to handle than conventional tractors, since the transmissions are hydraulic and not mechanical.

Figure 3:
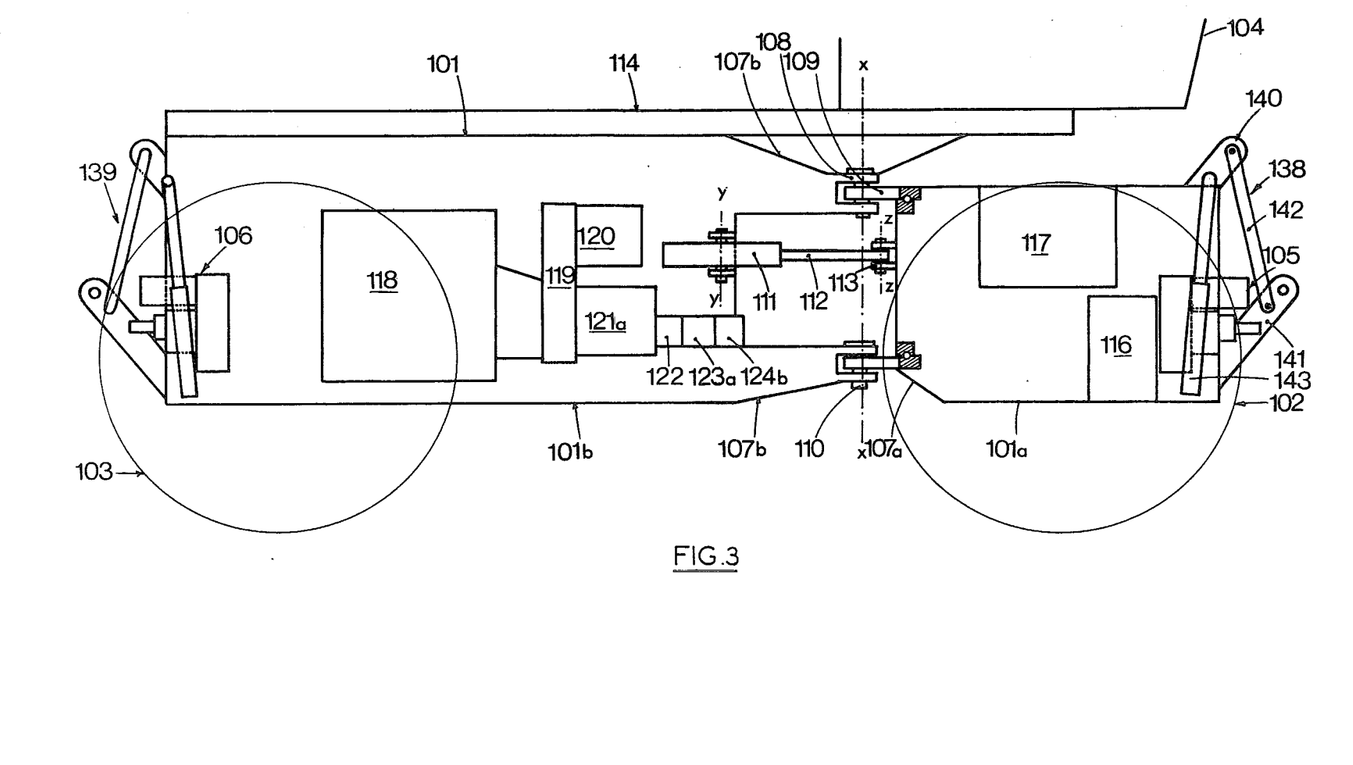
FIG. 3 is a diagrammatic and partial elevational view of an agricultural tractor according to a second embodiment of the invention.
Figure 4:
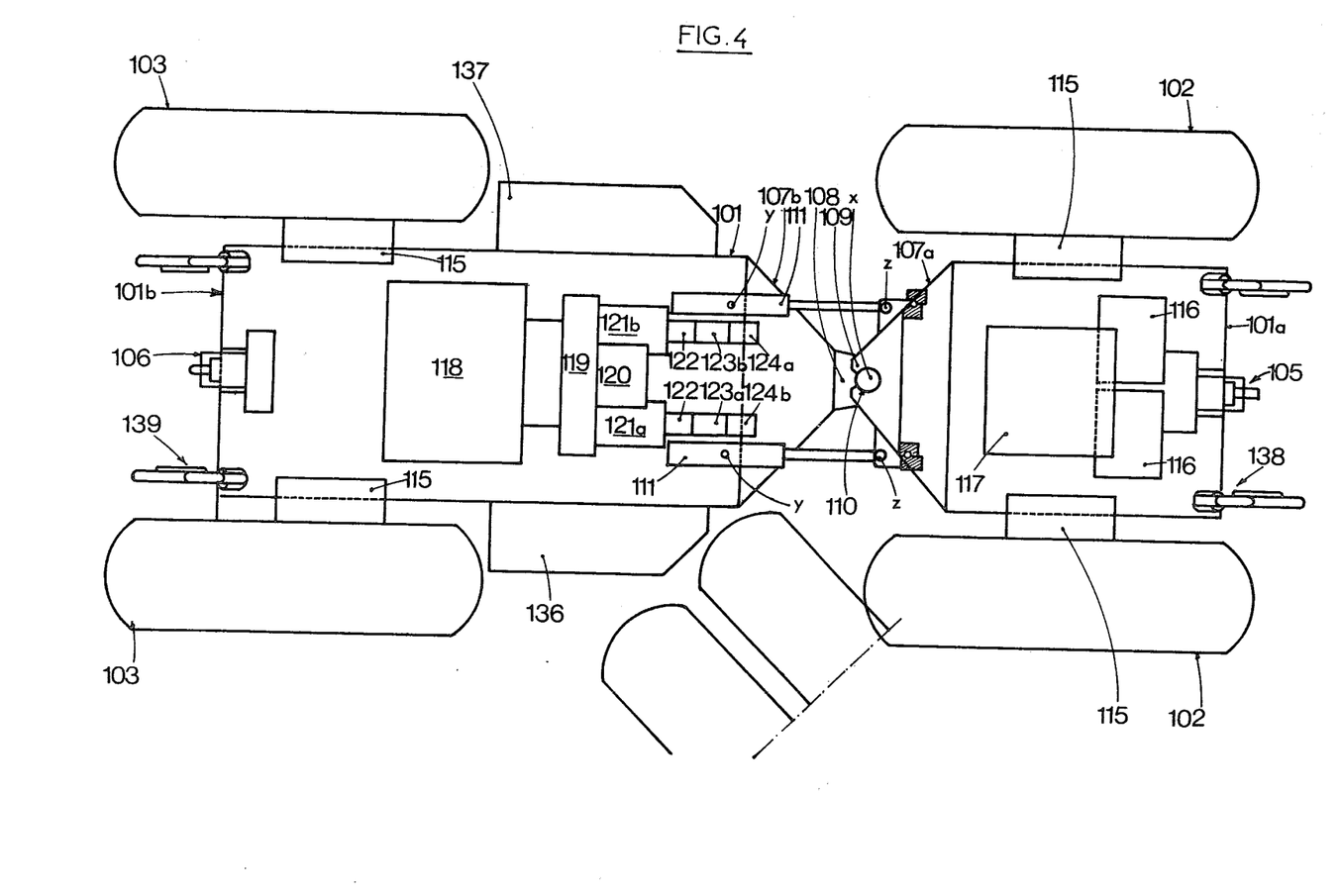
FIG. 4 is a diagrammatic and partial top plan view of the vehicle shown in FIG. 3.

The vehicle shown in FIGS. 3 and 4 comprises a chassis 1 supported by two sets of driving wheels 102 annd 103 and on which there is fixed a driving cab 104 enclosing the vehicle driving means and the means controlling the tools which may be coupled to two power take-offs 105 and 106 disposed respectively in the front and at the rear of the chassis.

The chassis 101 comprises, in the longitudinal direction, two sections 101a and 101b which are interconnected to pivot with respect to each other about a vertical axis X—X which is offset toward the front of the vehicle with respect to the middle of the latter, that is to say, with respect to the transverse plane midway between the front and rear faces of the chassis.

The front section 101a of the chassis has a generally parallel-sided shape and is extended rearwardly by a portion 107a having a trapezoidal horizontal section, whereas the rear section 101b also has a generally parallel-sided shape and is extended forwardly by an upper portion and a lower portion 107b having a trapezoidal horizontal section. These portions 107b terminate in forks 108 between which there are engaged brackets 109 which are integral with the portion 107a. These forks and brackets are pivotally interconnected by shaft portions 110. Two jacks 111 are mounted on the front face of the parallel-sided portion of the section 101b between the levels of the portions 107b so as to be disposed in the same horizontal plane and pivotable about vertical axes Y—Y located on said face. The ends of their rods 112 are mounted in two forks 113, respectively fixed to each of the two sides of the chassis portion 107a, to pivot about vertical axes Z—Z. It is essential to note that the general pivot axis X—X of the chassis is disposed in a transverse plane of the vehicle located practically at the rear of the front set of wheels 102. The chassis 101 is completed by an upper platform 114 which covers the entire area of the rear section 101b and extends forwardly beyond this part in overhanging relation to above the middle of the front set of wheels 102, this overhanging part carrying the cab 104 in the position for normal travel of the vehicle.

Such a pivoted arrangement of the chassis permits reducing to the maximum extent the gap between the latter and the wheels, so that it is possible to locate therein devices which are larger than in a rigid chassis. Indeed, a rigid chassis must provide a sufficient clearance between the wheels and the chassis to permit a suitable steering angle of the steering wheels. The gain as concerns the turning circle is between 20 and 30%. The offsetting of the pivotal connection in the direction of the front set of wheels above all permits a solution of the problem of the steerability of the machine in rows of plants. Indeed, the inclination of the front section of the chassis through a small angle, for example 10° on each side of the median axis, has practically no effect on the performance of the tools which may be coupled to the rear of the vehicle. The pivotal connection of the chassis is distinctly simpler, from the structural point of view, than the complex pivotal connection of steering wheels. It very definitely simplifies the supply of fluid to the driving wheels, each of which, as mentioned hereinafter, are driven by a hydraulic motor 115, since these wheels become fixed in position on the chassis. This results in a considerable reduction in the cost of the vehicle and a most appreciable mechanical simplification.

In addition to the hydraulic motors 115 which are integral with the front wheels 102 and drive the latter, and the front power take-off 105, the front section 101a of the chassis carries two batteries 116 and a cooling device 117.

Likewise, apart from the hydraulic motors 115 integral with and driving the rear wheels 103 and the rear power take-off 106, the rear section 101b of the chassis carries a drive unit constituted by an internal combustion engine 118 whose crankshaft is coupled to the input of a coupling box 119 which has three outputs respectively connected to a variable delivery and reversible hydraulic pump 120 for driving the power take-offs and to two units having a single driving shaft each unit being constituted by a variable delivery and reversible hydraulic pump 121a or 121b for driving the hydraulic motors 115, a booster pump 122, a hydraulic pump 123a or 123b for driving the raising devices described hereinafter and, on one side, a pump 124a driving the hydraulic motor of the fan of the cooling device and, on the other side, a pump 124b actuating the jacks 111.

Figures 5, 6:
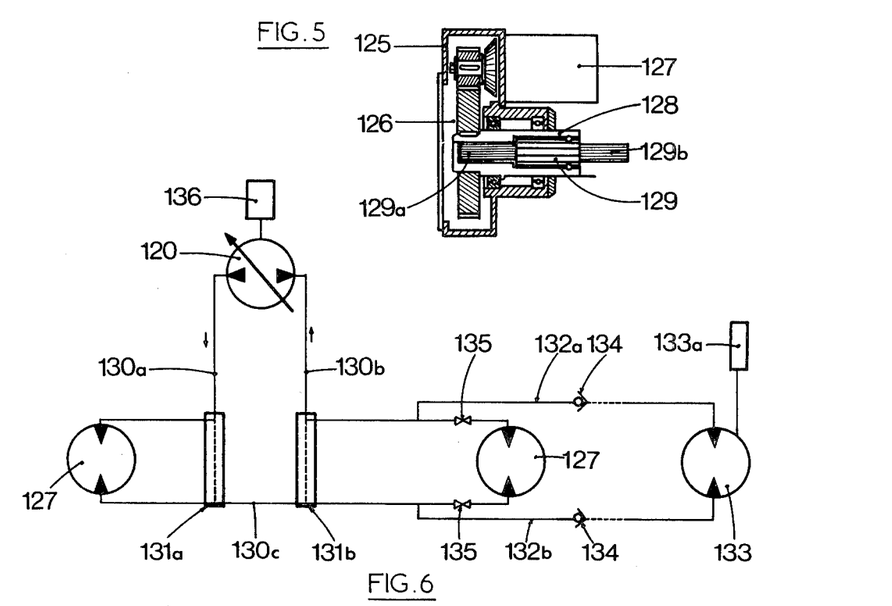
FIG. 5 is a sectional view, to an enlarged scale, of a hydraulic power take-off provided on this vehicle.
FIG. 6 is a diagram of the hydraulic circuit driving the power take-offs.

As shown in more detail in FIG. 5, each of the hydraulic power take-offs 105 or 106 comprises a case 125 within which there is disposed a speed-reducing train of gears 126 the input of which is integral with the shaft of a hydraulic motor 127, whereas the output is constituted by a hollow sleeve 128 which receives, in two coaxial stepped bores of different diameters, the central splined part of a power take-off shaft 129, the latter being fitted in corresponding splines of the associated bore, and one of the splined ends 129a of this shaft, the other splined end 129b of the latter projecting from the sleeve 128 for connection to a tool to be driven. One of the ends 129a and 129b of the shaft has a small number of splines, for example six, whereas the other has a larger number of splines, for example twenty-one so that, depending on which end is disposed inside the sleeve, the tool can be driven at two different speeds. Thus, for example, if the speed of rotation of the motor 127 is 3000 rpm, the utilizable end of the power take-off shaft can drive the tool at 540 rpm or 1000 rpm.

As shown in FIG. 6, the two outputs of the reversible pump 120 are connected by pipes 130a and 130b respectively to two inputs of the motors 127 for driving the power take-offs, whereas the other two inputs of these motors are interconnected by a third pipe 130c, the assembly thereby constituting a closed pipe circuit. Two electro-hydraulically actuated hydraulic distributor valves 131a and 131b are interposed, one, between the pipes 130a and 130c and, the other, between the pipes 130b and 130c so as to permit supplying fluid to one or the other of the motors 127 or to both at the same time.

The circuit further comprises two pipes 132a and 132b branch connected to the pipes 130b and 130c between the distributor valve 131b and the motor 127 and connected to the inputs of an auxiliary hydraulic motor 133 which is adapted to drive one of the tools 133a with which the vehicle is provided, these pipes 132a and 132b having check valves 134 which allow the passage of the fluid only in the direction of the motor. Stop valves 135 are inserted in the pipes 130b and 130c between the motor 127 and the branch connections of the pipes 132a and 132b.

The pump 120 is supplied with oil, as are moreover the pumps 121a and 121b, from an oil tank 136 which is fixed outside on one of the sides of the section 101b of the chassis in front of the rear wheel 103. A fuel tank 137 for supplying fuel to the engine 118 is disposed symmetrically on the other side of this section.

This circuit drives the front and rear power take-offs 105 and 106 either individually or simultaneously in one direction or the other and at a variable speed which may reach either of the aforementioned two values, the two power take-offs necessarily rotating at the same speed when they are employed simultaneously owing to the use of a hydraulic control circuit in series.

Such a power take-off driving circuit has the great interest of taking advantage of the presence of a central hydraulic drive for the vehicle constituted by the engine 118, the box 119, the pumps 121a and 121b and the motors 115 so as to provide a hydraulic power transmission with no difficulty. Such an arrangement uses the same oil tank, the same cooling device and the same filtering means as those already existing in the vehicle drive device.

In addition to the simplicity of construction of this power take-off drive circuit, there is an excellent utilization of these power take-offs owing to the extreme flexibility of use of its component parts and in particular the variable delivery pump.

The vehicle further comprises at each of its two longitudinal ends a hydraulic raising device 138 or 139, two of these devices being provided at each end, one on the left side and the other on the right side. As shown in FIGS. 3 and 4, each of these four devices is disposed in a vertical plane parallel to the longitudinal median plane of the vehicle and is constituted by a lower arm 140, an upper arm 141, a stay 142, and a jack 143. The two arms 140 and 141 are mounted at one of their ends on the front face of the section 101a of the chassis to pivot about horizontal transverse axes and respectively in the lower region and upper region of this front face.

The stay 142 is pivoted, on one hand, to the other end of the arm 140 and, on the other hand, to the lower arm 141 in the vicinity of the other end of the lower arm 141, this end being adapted for the fixing of a tool.

The jack 143 is pivoted in the lower region of the front face of the chassis and its upwardly extending rod is pivoted to the arm 140 in the vicinity of the end of the arm 140 which receives the stay 142.

Figure 7:
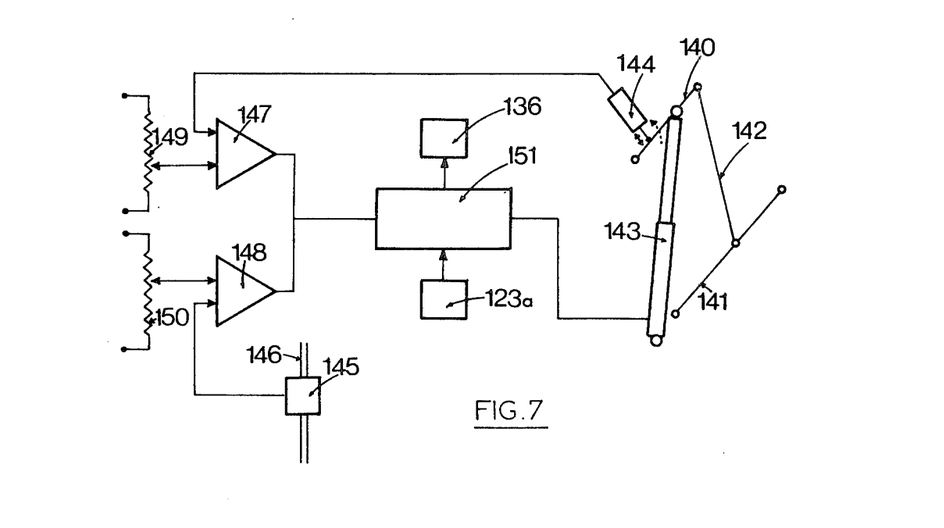
FIG. 7 is a diagram of the electro-hydraulic control circuit for the raising devices of the vehicle.

As shown in FIG. 7, the device actuating such a raising device 138 or 139 comprises, on one hand, a displacement sensor 144 disposed above the upper arm 140 and actuated by the latter in accordance with its displacement, and on the other hand, a pressure sensor 145 inserted in a pipe 146 which connects either of the pumps 121a and 121b to the hydraulic motors 115 of the wheels. The sensor 144 is connected to one of the inputs of an amplifier 147 controlling the position of the raising device, and the sensor 145 is connected to one of the two inputs of another amplifier 148 controlling the force applied to the tool, the other input of the amplifier 147 being connected to a slide of a potentiometer 149 controlling the position and the second input of the amplifier 148 being connected to the slide of a second potentiometer 150 controlling the force, these two potentiometers being disposed in the cab so as to allow the driver to regulate them.

The two outputs of the amplifiers 147 and 148 are connected to the electric control input of a hydraulic distributor valve 151 which is actuated electro-hydraulically and has an input connected to the corresponding raising pump 123a or 123b and two outputs, one of which outputs is connected to the fluid supply of the jack 143 and the other is connected to the oil tank 136.

The pressure sensor 145 delivers a voltage which is proportional to the pressure of the fluid fed to the motors 115 driving the wheels and therefore proportional to the force of resistance applied to these wheels on the part of the tools carried by the vehicle which are either pushed along, if they are secured to the front raising devices 138, or towed if they are secured to the rear raising devices 139. The value of this force is then compared in the amplifier 148 with the value that the driver fed into or set on the force control potentiometer 150. If the value given by the sensor is higher than that set by the driver, the control produces the opening of the distributor valve 151 so as to raise the arms and consequently relieve the towing or pushing force.

When the value given by the sensor once again reaches the control value, the control produces the closure of the distributor valve. As the position chosen for the raising device is thus reached, it is the position control device 149 and the displacement sensor 144 which permit a regulation of the raising by bringing the latter constantly to the previously-determined position. The operation is of course symmetrical in the case where the value given by the sensor 145 is lower than the value set by the driver.

Such a control of the raising devices has the great advantage of benefitting from the presence of a hydraulic drive for driving the driving wheels, in that the force applied to the tools is taken directly from the oil pressure prevailing in the oil supply circuit for the driving motors.

Having now described my invention, what I claim as new and desire to secure by Letters Patent is:

1. A tractor vehicle, in particular for agricultural use, comprising a chassis having a longitudinal axis, at least a front set of driving wheels and a rear set of driving wheels supporting the chassis with at least one wheel of each set being positioned on each lateral side of said longitudinal axis, a cab, means mounting the cab on the chassis and allowing the cab to travel from one end of the vehicle to an opposite end of the vehicle in a direction parallel to said longitudinal axis, an engine and power take-off means carried by the chassis, the power take-off means being for connection to tool means, first means for controlling the driving and steering of the vehicle and second means for controlling the tool means connected to the take-off means, the first and second means being located inside the cab, two independent drive means, one of the drive means being drivingly connected to a pair of said wheels located on one lateral side of said longitudinal axis and the other of the drive means being drivingly connected to a pair of said wheels located on an opposite lateral side of said longitudinal axis, transmission means drivingly connecting the engine to the two drive means, variator-inverter means included in the two drive means, whereby the engine is capable of driving selectively either of the drive means, both of the drive means at the same time in a symmetrical manner and in an unsymmetrical manner, means included in the two drive means for reversing the drive means so that the vehicle can be made to travel in two opposite directions, substantially identical raising devices respectively mounted on the chassis at longitudinally opposed ends of the vehicle for carrying said tool means, a driving station located in the cab and mounted to pivot through at least 180° about a vertical axis relative to the chassis whereby, irrespective of the direction of travel of the vehicle, the operator of the vehicle can face and be close to the stretch of ground to be treated.

2. A tractor vehicle as claimed in claim 1, wherein each of the two independent drive means comprises a closed fluid circuit and a variable delivery and reversible hydraulic pump inserted in the closed circuit, a coupling box having three outputs and an input being interposed between the two pumps and the engine, the engine being drivingly connected to the input, two of said outputs of the coupling box being respectively drivingly connected to the two pumps and a third of said outputs of the coupling box being drivingly connected to said power take-off means.

3. A tractor vehicle as claimed in claim 2, wherein each raising device is a hydraulic raising device, and control means located in the cab are connected to control the hydraulic actuation of the raising device.

4. A tractor vehicle as claimed in claim 2, wherein each wheel has a hydraulic motor combined therewith to drive the wheel, the hydraulic motors being inserted in said closed circuit of the corresponding independent drive means.

5. A tractor vehicle as claimed in claim 1, comprising rails mounted on the chassis and extending in a direction parallel to said longitudinal axis and rollers carried by the cab and rollingly engaged on the rails, means for holding the cab in any chosen position on said rails, the size of the cab being such that positioning the cab at an end of the chassis makes available a loading platform.

6. A tractor vehicle as claimed in claim 1, wherein there are three sets of said wheels, said front and rear sets of wheels forming driving and pivotable steering wheels and the third set of wheels being mounted on the chassis to remain parallel to said longitudinal axis in plan, each independent driving means driving all the wheels located on the corresponding side of the chassis.

7. A tractor vehicle as claimed in claim 1, wherein the chassis comprises, in the direction of said longitudinal axis, two chassis sections, and pivot means interconnecting the two sections for pivoting about a vertical axis which is offset toward the front of the vehicle with respect to the middle of the length of the vehicle so that one chassis section is longer than the other chassis section, said means mounting the cab on the chassis being mounted on the longer chassis section and extending beyond the longer chassis section to overhang the shorter chassis section.

* * * * *